(12) United States Patent  
Wuerthinger et al.

(10) Patent No.: US 8,930,920 B2
(45) Date of Patent: Jan. 6, 2015

(54) SELF-OPTIMIZING INTERPRETER AND SNAPSHOT COMPILATION

(71) Applicant: Oracle International Corporation, Redwood Shores, CA (US)

(72) Inventors: Thomas Wuerthinger, Utzenaich (AT); Douglas Norman Simon, Uster (CH); Christian Wimmer, Foster City, CA (US); Lukas Stadler, Oberkappel (AT); Gilles Marie Duboscq, Linz (AT)

(73) Assignee: Oracle International Corporation, Redwood Shores, CA (US)

( * ) Notice: Subject to any disclaimer, the term of this patent is extended or adjusted under 35 U.S.C. 154(b) by 55 days.

(21) Appl. No.: 13/731,698

(22) Filed: Dec. 31, 2012

(65) Prior Publication Data

US 2014/0189661 A1 Jul. 3, 2014

(51) Int. Cl.
*G06F 9/45* (2006.01)
*G06F 9/455* (2006.01)

(52) U.S. Cl.
CPC .......... *G06F 9/4552* (2013.01); *G06F 9/45508* (2013.01); *G06F 8/41* (2013.01)
USPC ........................................ 717/139; 717/140

(58) Field of Classification Search
CPC ............................... G06F 9/45508; G06F 8/41
USPC ................................................. 717/139, 140
See application file for complete search history.

(56) References Cited

U.S. PATENT DOCUMENTS

| 5,933,635 | A | 8/1999 | Holzle et al. |
| 6,518,979 | B1 * | 2/2003 | Spertus et al. ................ 715/762 |
| 8,819,649 | B2 * | 8/2014 | Lafreniere et al. ............ 717/139 |

OTHER PUBLICATIONS da Silva et al. "An Experimental Evaluation of JAVA JIT Technology", 2005.*
Consel, C., Pu, C., Walpole, J., "Incremental Partial Evaluation: The Key to High Performance, Modularity and Portability in Operating Systems," In Proceedings of the Symposium on Partial Evaluation and Semantics-Based Program Manipulation, Jan. 1993, 3 pages.

* cited by examiner

*Primary Examiner* — Phillip H Nguyen
(74) *Attorney, Agent, or Firm* — Osha Liang LLP

(57) ABSTRACT

A method for a compiler includes receiving, by the compiler and from an interpreter, a representation of a code section having a control path that changes the representation. The representation has profiling data, and the profiling data has a threshold. The method further includes performing, by the compiler and based on the threshold, a partial evaluation of the interpreter executing the representation, compiling, by the compiler, a machine code of the representation, with the control path replaced by a deoptimization point during the compilation of the machine code, triggering the deoptimization point during execution of the machine code, and returning execution to the interpreter based on the triggering.

17 Claims, 4 Drawing Sheets

US 8,930,920 B2

SELF-OPTIMIZING INTERPRETER AND SNAPSHOT COMPILATION

BACKGROUND

Programmers are always trying to find the most efficient way to execute their code, whether the code is executed using an interpreter, compiler, or both. An interpreter is a program that is capable of executing source code. A compiler transforms the source code into another form, such as machine code. When the code is transformed, an interpreter is not required to execute the program. Each choice has advantages and disadvantages. Any improvements in interpreters and/or compilers could greatly improve the efficiency of executing code, thereby making programmers jobs easier, and allowing consumers to have faster programs.

SUMMARY OF INVENTION

In general, in one aspect, the invention relates to a method for a compiler. The method comprises receiving, by the compiler and from an interpreter, a representation of a code section having a control path that changes the representation, wherein the representation comprises profiling data, and wherein the profiling data comprises a threshold; performing, by the compiler and based on the threshold, a partial evaluation of the interpreter executing the representation; compiling, by the compiler, a machine code of the representation, wherein the control path is replaced with a deoptimization point during compilation of the machine code; triggering the deoptimization point during execution of the machine code; and returning execution to the interpreter based on the triggering.

In general, in one aspect, the invention relates to a non-transitory computer readable medium storing instructions for a compiler. The plurality of instructions comprising functionality to receive, from an interpreter, a representation of a code section having a control path that changes the representation, wherein the representation comprises profiling data, and wherein the profiling data comprises a threshold; perform, based on the threshold, a partial evaluation of the interpreter executing the representation; and compile a machine code of the representation, wherein the control path is replaced with a deoptimization point during compilation of the machine code, and wherein triggering the deoptimization point during execution of the machine code returns execution to the interpreter.

In general, in one aspect, the invention relates to a system for a compiler. The system comprises: a processor; a memory; an interpreter executing on the processor and configured to: execute a representation of a code section having a control path that changes the representation, wherein the representation comprises profiling data, and wherein the profiling data comprises a threshold; and a compiler executing on the processor and configured to: receive, from the interpreter, the representation of the code section; perform, based on the threshold, a partial evaluation of the interpreter executing the representation; compile a machine code of the representation, wherein the control path is replaced with a deoptimization point during compilation of the machine code; trigger the deoptimization point during execution of the machine code; and return execution to the interpreter based on the triggering.

Other aspects and advantages of the invention will be apparent from the following description and the appended claims.

DETAILED DESCRIPTION

Figure 1:
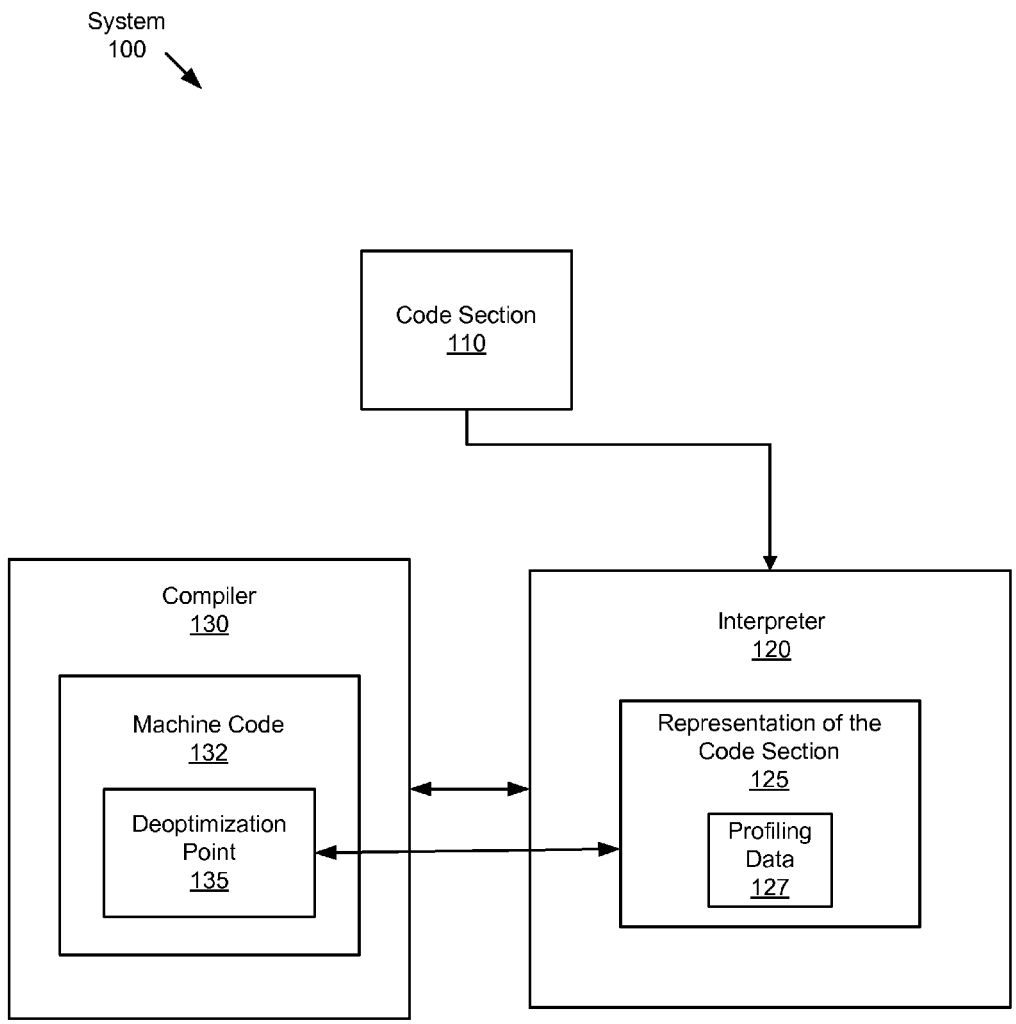
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for a self-optimizing interpreter and snapshot compiling. Specifically, the interpreter may create a representation of a code section, and execute the representation. In one or more embodiments of the invention, the interpreter is self-optimizing, meaning that during execution of the code section by the interpreter (i.e., during runtime) the interpreter may change the representation such that the interpreter improves the execution speed. Further, during execution by the interpreter, profiling information is gathered, which may indicate how stable the representation is, what the input types, values, or value ranges are, etc. After a portion of the representation is determined to be stable, that portion is compiled into machine code using a compiler by performing partial evaluation on the interpreter executing the portion of the representation, and a deoptimization point is inserted at any location where a control path may change the representation. When the deoptimization point is triggered during execution of the machine code, execution is returned to the interpreter.

FIG. 1 shows System (100), which includes Code Section (110), Interpreter (120), Representation of the Code Section (125), Profiling Data (127), Compiler (130), Machine Code (132), and Deoptimization Point (135). In one or more embodiments of the invention, Code Section (110) is a source code file, or portion thereof, that will be executed. Code Section (110) may be in any programming language now known or later developed. In one or more embodiments of the invention, Code Section (110) may contain multiple files and/or multiple programming languages, and may be of any size. Alternatively, Code Section (110) may contain a single file in a single programming language. It will be apparent to one of ordinary skill in the art that Code Section (110) may be configured in many different ways and, as such, should not be limited to the above examples.

In one or more embodiments of the invention, Interpreter (120) is any kind of interpreter for any programming language now known or later developed. Interpreter (120) may translate Code Section (110) into an intermediate representation (i.e., Representation of the Code Section (125)) and execute the intermediate representation. Alternatively, Interpreter (120) may directly execute Code Section (110), or may execute previously compiled code. Further still, Interpreter (120) may execute code using some combination of the above methods, and/or any other method now known or later developed.

Turning briefly to the representation, in one or more embodiments of the invention, Representation of the Code Section (125) is generated by Interpreter (120). Alternatively, Representation of the Code Section (125) may be generated by any other suitable component or module. Representation of the Code Section (125) may take many different forms including, but not limited to: abstract syntax trees (AST), graphs, flows, and/or any other suitable form. In one or more embodiments of the invention, Representation of the Code Section (125) includes Profiling Data (127) as well as associated code (e.g., a node may contain profiling data associated with that node, etc). For example, if the representation is an AST, then each leaf on the AST is a node. Every operation in the programming language is encoded in an AST node. The AST node is responsible for executing the node's associated operation and returning a result value (if non-void). A program, or portion of a program, is executed by executing the program's root AST node. Every node may contain a pointer to its parent node, allowing for fast replacement of one node with another. In one or more embodiments of the invention, the execution of different ASTs that involve the same function/operation may rely on different machine code. For example, if two different ASTs both include an add operation, then through the use of the method (discussed in detail below), specialized machine code may be created that is valid only when executing a specific AST.

For any given representation, there may be a variety of control paths through which execution may flow. Specifically, a control path refers to the order in which the individual statements of a program (or representation) are executed or evaluated. A control path does not normally change the AST much during runtime, however, with a self-optimizing interpreter, the AST may change. For example, the self-optimizing interpreter may optimize a function during runtime based on the inputs to the function (e.g., an INT input would be handled differently than a DOUBLE). Thus, if a new input is received during runtime, the AST may need to change/update to accommodate the new input(s) resulting in a new control path.

In one or more embodiments of the invention, Profiling Data (127) are metrics gathered during execution of the code (i.e., at runtime). Profiling Data (127) may include, but is not limited to: the number of times a unit of code (e.g., a node, a loop, a method, etc.) has been executed, how recently Representation of the Code Section (125) (or a portion thereof) has been dynamically changed, the actual values, value ranges, and/or types of inputs given to an operation at runtime, etc. In one or more embodiments of the invention, Profiling Data (127) is used as a threshold for determining the stability of Representation of the Code Section (125) (or a portion thereof), and when a section of code should be speculatively frozen, partially evaluated, and compiled to create Machine Code (132). The stability of Representation of the Code Section (125) refers to a likelihood that Representation of the Code Section (125) will need to be updated (i.e., a control path exists that changes Representation of the Code Section (125)), as described below. Because of the impossibility to predict with certainty whether the representation will be updated, the stability may be a simple threshold. For example, if a section of code has been executed 100 times without changing, that section of code may be considered to be stable enough to compile into Machine Code (132). On the other hand, if the same section of code was executed 1000 times, there is less of a chance that the representation will need to be changed, in comparison to only having been executed 100 times. Obviously, the threshold may be any number, large or small, and a balance will need to be struck between compiling the section too early and too late.

Returning to Interpreter (120), in one or more embodiments of the invention, Interpreter (120) is self-optimizing and able to dynamically change aspects of the Representation of the Code Section (125). In other words, self-optimizing means that Interpreter (120) is able to improve the execution of Representation of the Code Section (125) during runtime. For example, if the Representation of the Code Section (125) is an AST, then dynamically changing aspects of Representation of the Code Section (125) may include specializing a node by changing the type of the node (e.g., INT→LONG, INT→STRING, Uninitialized→DOUBLE, etc.), changing profiling data (e.g., increasing the execution count of the associated code, etc.), duplicating nodes, and/or changing any other suitable aspect of Representation of Code Section (125). Specifically, changing a type of a node may involve adding an additional node(s), with a specific type, such that every operation has a specialized node for each possible type. In one or more embodiments of the invention, the dynamic changes occur during execution of the code (i.e., during runtime), and may be in response to optimizations the Interpreter (120) makes. Alternatively, the dynamic changes may be made for any other suitable reason. Many ways to dynamically change aspects of Representation of the Code Section (125) exist and, as such, the invention should not be limited to the above examples.

In one or more embodiments of the invention, Compiler (130) is communicatively connected with Interpreter (120). Compiler (130) may execute on the same device as Interpreter (120), or may execute on a separate device. In one or more embodiments of the invention, Compiler (130) is able to perform a partial evaluation on Representation of the Code Section (125). Partial evaluation is the process by which Machine Code (132) is created. Specifically, partial evaluation creates machine code specific to a given AST root. Partial evaluation is performed on a software method by replacing a parameter of the method with a constant. For example, given a function f(x,y)=1+y+x, then a partial evaluation could be f(x,1)=2+x. However, in the present invention, the software method on which partial evaluation is performed is an interpreter (i.e., Interpreter (120)), and the parameter that is replaced with a constant is the program passed to the interpreter for execution (e.g., the AST). In other words, a specific execution of a program by an interpreter (i.e., a given AST executed by an interpreter) is compiled into machine code.

In one or more embodiments of the invention, partial evaluation results in machine code compiled specifically for a given method (e.g., a given portion of Representation of the Code Section (125)). In other words, when a portion "A" of Representation of the Code Section (125) is partially evaluated and compiled, the resulting machine code is only valid when the interpreter wants to execute portion "A," and not when portion "B" of the AST is executed, even when portion "B" includes identical operations/methods to "A."

In one or more embodiments of the invention, partial evaluation may be speculative, meaning that Representation of the Code Section (125) may change after Machine Code (132) has been compiled, resulting in a need to deoptimize out of Machine Code (132), via a deoptimization point (described below) or other mechanism. In other words, when partial evaluation is performed, the AST on which the partial evaluation is performed may be frozen, and treated as though the AST was stable. When freezing the AST, all profiling information stored in the AST is treated as stable (i.e., final) and the stability automatically propagates from the root node to all of the root node's children, In one or more embodiments of the invention, partial evaluation may also involve, iterating over at least a portion of the Representation of the Code Section (125) and inlining an execute method for each node Inlining is the replacement of a function call site with the body of the callee. In other words, instead of having a function call, inlining would remove the function call and instead replace the function call with the entire code of the function itself. In one or more embodiments of the invention, the partial evaluation is performed after a threshold, or other measure of stability, is exceeded. The threshold may be maintained in Profiling Data (127), or in any other suitable place. For example, the threshold may be a simple counter that tracks the number of times that node, method, loop, code section, etc., has been executed. Alternatively, the threshold may be based on how recently Representation of the Code Section (125) has changed, some combination of both, or any other suitable threshold or stability measurement may be used. In one or more embodiments of the invention, the partial evaluation may be speculative. In other words, the partial evaluation may be performed before Representation of the Code Section (125) is finalized (i.e., the representation may change). In one or more embodiments of the invention, the amount of code in the code section being frozen and partially evaluated may be very small, such as a single loop. Alternatively, larger chunks of code may be frozen and evaluated.

In one or more embodiments of the invention, Compiler (130) produces Machine Code (132). By configuring the compiler in a method consistent with the invention, programs using a dynamically typed programming language may be executed as fast as statically typed languages. In one or more embodiments of the invention, Machine Code (132) includes at least one Deoptimization Point (135) placed where a control path may change Representation of the Code Section (125). Specifically, Deoptimization Point (135) is an exit point back to Interpreter (120). In other words, during execution of Machine Code (132), when Deoptimization Point (135) is reached, execution returns to Interpreter (120), and Representation of the Code Section (125), at the appropriate location. A deoptimization point may be placed at every location where a control path could change the Representation of the Code Section (125). In other words, if at any point during execution, a point is reached that changes Representation of the Code Section (125) then the corresponding machine code (assuming there is corresponding machine code) must be deoptimized. Further, in one or more embodiments of the invention, when Machine Code (132) is compiled, any control path that leads to changes in Representation of the Code Section (125) may be cut-off.

For example, assume a system exists with an add operation and two types: INT and STRING. On the first execution of the add operation, two INTs are used as inputs. The interpreter would self-optimize for handling the case of adding two INTs, thereby improving execution speed in one or more embodiments of the invention. After executing enough times to exceed a stability threshold (e.g., the add operation has executed 15 times without receiving a STRING as input, and thus no change to the representation), machine code would be compiled for the add operation that would be specialized for the case of adding two INTs in one or more embodiments of the invention. However, because other inputs are possible (i.e., a STRING) a deoptimization point will exist in the machine code in case an addition of STRINGs is requested. The deoptimization point exists because if a STRING addition were requested, the representation would need to change. Thus, when on some subsequent execution of the machine code the addition of two STRINGs is requested, the deoptimization point triggers, execution returns to and continues in the interpreter, and the representation will be updated to reflect a more generic version of the add operation. Given enough subsequent executions and inputs, the representation may further specialize and eventually be recompiled into machine code.

Figure 2:
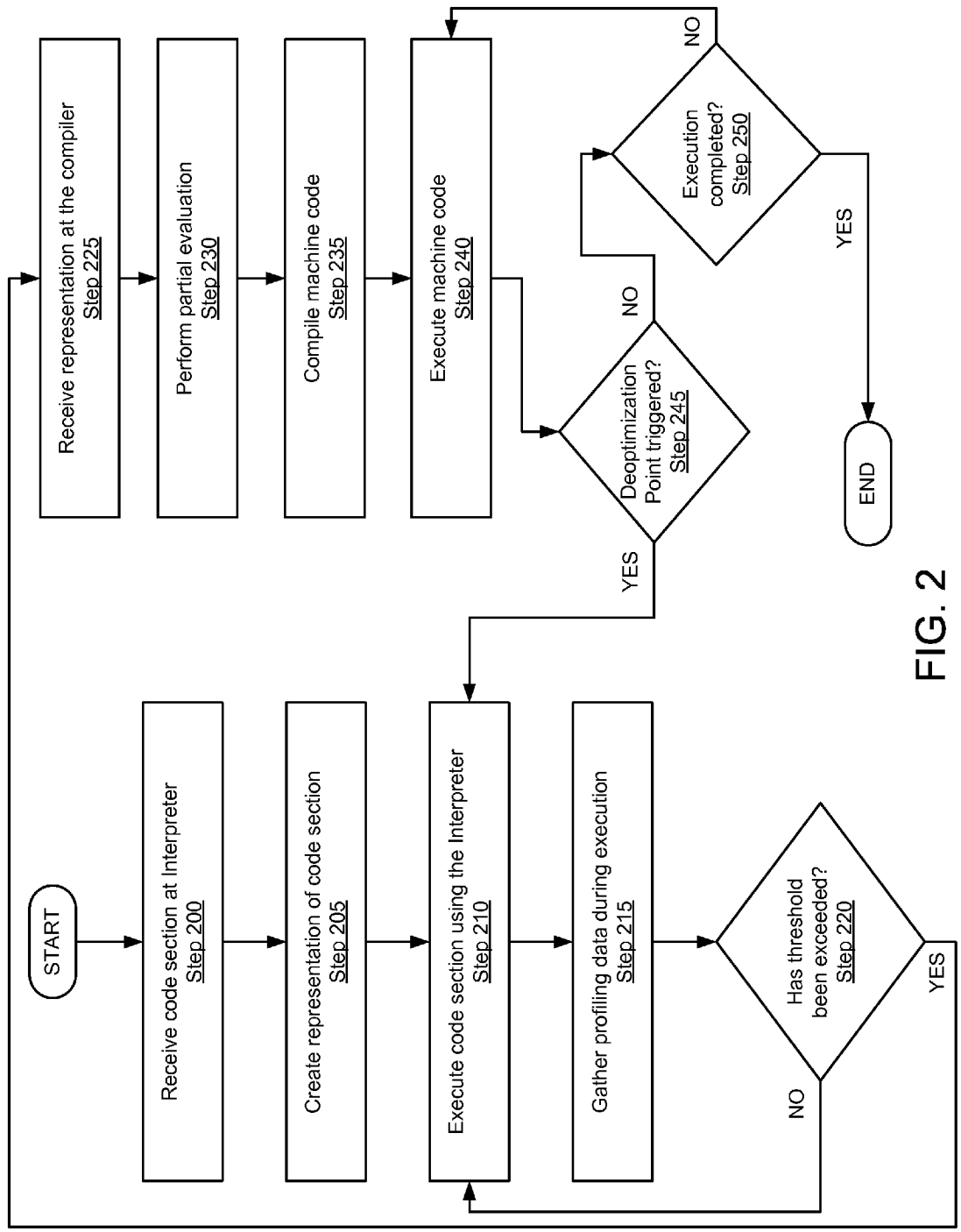
FIG. 2 shows a flowchart of a method in accordance with one or more embodiments of the invention.

FIG. 2 shows a flowchart of a method for a compiler. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In Step 200, the interpreter receives the code section, in accordance with one or more embodiments of the invention. The code section may be received from any source, may be in any programming language, and may be a single file or multiple files. After receiving the code section, the method proceeds to Step 205.

In Step 205, a representation of the code section is created, in accordance with one or more embodiments of the invention. The representation may be created using any method now known or later developed. Further, the representation of the code section may take any form including, but not limited to ASTs, graphs, flows, etc. In one or more embodiments of the invention, multiple representations of the code section may be created, for example, one by the interpreter and one by the compiler. Next, the method proceeds to Step 210.

In Step 210, the interpreter executes the code section, in accordance with one or more embodiments of the invention. In one or more embodiments of the invention, the interpreter executes the representation of the code section, rather than directly executing the code section. The code section may be executed many times in a row, depending on the program, or portion of a program, being executed. The code section may be executed in many ways and, as such, should not be limited to the above examples.

In Step 215, the interpreter gathers profiling data during execution, in accordance with one or more embodiments of the invention. Specifically, as the code is executed, runtime feedback including, but not limited to: the number of times a unit of code (e.g., a node, etc.) has been executed, how recently a node has been dynamically changed, the values of input(s), the ranges of input(s), the type(s) of inputs, etc., is collected. In one or more embodiments of the invention, the profiling data gathered during execution may be used as a threshold for determining when a section of code should be speculatively frozen, partially evaluated, and compiled to create machine code. Further, the gathered profiling data may be used by the interpreter to self-optimize the code section by dynamically changing the representation of the code section, as described previously.

In Step 220, a determination is made whether or not a threshold has been exceeded, in accordance with one or more embodiments of the invention. If the threshold has not been exceeded, the method returns to Step 210, and the program continues to execute. Optionally, in one or more embodiments of the invention, the program may complete execution, and the method may end (not shown). If the threshold has been exceeded, the method proceeds to Step 225.

In Step 225, the compiler receives the representation of the code section, in accordance with one or more embodiments of the invention. The compiler may receive the representation by any method now known or later developed. In one or more embodiments of the invention, the representation received by the compiler may be a small portion of the overall program, such as a single loop, or an individual method. It will be apparent to one of ordinary skill in the art that the representation received may be of any size and, as such, the invention should not be limited to the above examples.

In Step 230, partial evaluation is performed on the interpreter executing the representation, in accordance with one or more embodiments of the invention. Partial evaluation may include, for example, freezing the representation and treating the representation as though the representation is stable and in a final form. In other words, the representation may change as the program continues to execute. Further, partial evaluation may include iterating over the nodes of the representation and inlining the execute methods of the nodes.

In Step 235, machine code is compiled, in accordance with one or more embodiments of the invention. In one or more embodiments of the invention, Step 235 may be performed simultaneously with Step 230. The machine code includes deoptimization points, as needed, to return execution back to the interpreter. The deoptimization points may be located in the machine code wherever there is a control path that would change the representation of the code section. The locations of the deoptimization points are determined by the control paths of the representation. In one or more embodiments of the invention, any control paths leading to changes in the representation are cut-off during compilation. It will be apparent to one of ordinary skill in the art that there are many ways to compile the machine code and, as such, the invention should not be limited to the above example(s). Next, the method proceeds to Step 240.

In Step 240, machine code is executed, in accordance with one or more embodiments of the invention. The machine code may be executed in conjunction with portions of the program executed by the interpreter. Next, the method proceeds to Step 245.

In Step 245, a determination is made as to whether a deoptimization point has been triggered during execution of the machine code, in accordance with one or more embodiments of the invention. If a deoptimization point has been triggered, then the method returns to Step 210, and the code is executed using the interpreter. Alternatively, if a deoptimization point has not been triggered, the method proceeds to Step 245. A deoptimization point is triggered when program execution follows a control path that changes the representation of the code section. If the deoptimization point were not present, the program may crash because, for example, the machine code is not able to handle the type of variable or operation.

In Step 250, a determination is made as to whether execution is finished, in accordance with one or more embodiments of the invention. If execution is finished, the method ends. If execution is not finished, the method returns to Step 240. Alternatively, the method may return to Step 210, depending on the control path and execution of the program (not shown).

In one or more embodiments of the invention, it is possible for machine code to be deoptimized without specifically having triggered a deoptimization point located within the machine code. In other words, a change to the representation of the code section may need to be made based on some other mechanism or factor, and the change may necessitate the machine code being deoptimized. For example: a system may have a global parameter, X, having an initial value of 7. In an AST, an access to X would be represented as a node that returns the value 7. If, at some point, a node representing an access of X is compiled into machine code, a deoptimization point is not present, because the node is merely an access, and thus no control path exists that changes X. However, a node elsewhere may exist in the AST that does change X. If X is changed by some other node, then all machine code that includes an access to X must be deoptimized. In other words, the deoptimization is triggered by some completely different code in the system. In one or more embodiments of the invention, the common property between placing a deoptimization point at a control path that changes the representation and a deoptimization triggered by some completely different code in the system, is that in both cases a node rewrite is performed. Other situations may cause a deoptimization without having specifically triggered a deoptimization point within machine code and, as such, the invention should not be limited to the above examples.

The following section describes various examples of the invention. The examples are included to aid in the understanding of the invention and are not intended to limit the scope of the invention.

Figure 3:
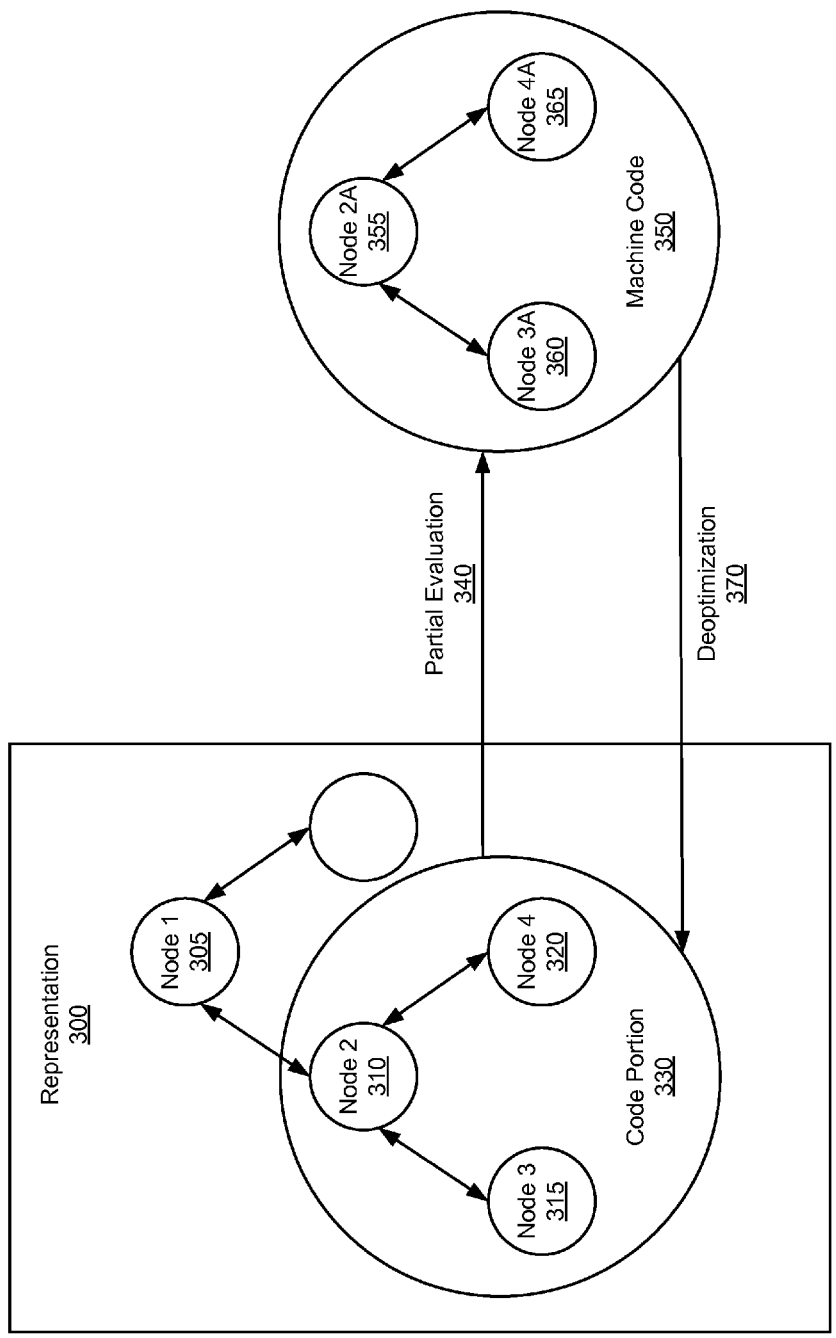
FIG. 3 shows an example in accordance with one or more embodiments of the invention.

FIG. 3 shows an example of compilation and deoptimization in accordance with one or more embodiments of the invention. FIG. 3 includes Representation (300). Representation (300) is a representation of a code section or source code file(s), and may be in any suitable form. In this example, Representation (300) is an abstract syntax tree (AST). Representation (300) includes a variety of nodes (e.g., Node 1 (305), Node 2 (310), Node 3 (315), and Node 4 (320)). In one or more embodiments of the invention, each node (e.g., Node 1 (305), Node 2 (310), Node 3 (315), and Node 4 (320)) may represent an operation, such as addition or subtraction, and may be type-specific. Representation (300) is executed by an interpreter, during which run-time profiling data is gathered. This run-time profiling data may be stored in individual nodes (e.g., Node 1 (305), Node 2 (310), Node 3 (315), and Node 4 (320)), and may include an execution count or threshold, the values of inputs, the types of inputs, the range of values of inputs, and/or any other suitable data.

Representation (300) includes Code Portion (330), which includes Node 2 (310), Node 3 (315), and Node 4 (320). Code Portion (330) is a subsection of Representation (300). For example, Code Portion (330) may be a loop. After the program depicted in Representation (300) has executed multiple times, a threshold my be exceeded. This threshold may represent the stability (e.g., how recently Representation (300) has been dynamically changed) of Representation (300), for example. When the threshold is exceeded the code may be compiled into machine code to ensure faster execution times. In this example, Code Portion (330) has exceeded the threshold and Partial Evaluation (340) is performed on the interpreter executing Code Portion (330) to compile the nodes into Machine Code (350). Partial Evaluation (340) may be speculative, as Representation (300) may change as the program continues to execute. Partial Evaluation (340) may involve freezing the representation by assuming that the root node (i.e., Node 2 (310)) is constant, and subsequently propagating the stability through to the child nodes of Node 2 (310), namely Node 3 (315) and Node 4 (320).

Further, partial evaluation may involve inlining the execute method of each node (e.g., Node 2 (310), Node 3 (315), and Node 4 (320)). Machine Code (350) includes Node 2A (355), Node 3A (360), and Node 4A (365), which are substantially the same as Node 2 (310), Node 3 (315), and Node 4 (320), except that Node 2A (355), Node 3A (360), and Node 4A (365) are stored as machine code. Effectively, Node 2 (310), Node 3 (315), and Node 4 (320) have been replaced in the execution of the program. That is, after Partial Evaluation (340), when the program needs to execute Node 2 (310), Node 2A (355) will be executed because Node 2A (355) is stored as machine code, and will execute faster. Machine Code (350) is a specific version of the root node (i.e., Node 2 (310)) and is only valid when Node 2 (310) is desired to be executed (although, Node 2A (355) is specifically what would be executed, as it is the compiled version of Node 2 (310)).

Eventually, during execution of the program, a control path that may change Representation (300) is encountered. If this control path is encountered in Machine Code (350) then a deoptimization point is present to allow the execution to return to the interpreter via Deoptimization (370). By deoptimizing, the execution returns to the interpreter, which may then update the representation as necessary, Alternatively, or in addition, Machine Code (350) may be deoptimized by changes to Representation (300) caused by some other mechanism (i.e., not a deoptimization caused by a deoptimization point).

Figure 4:
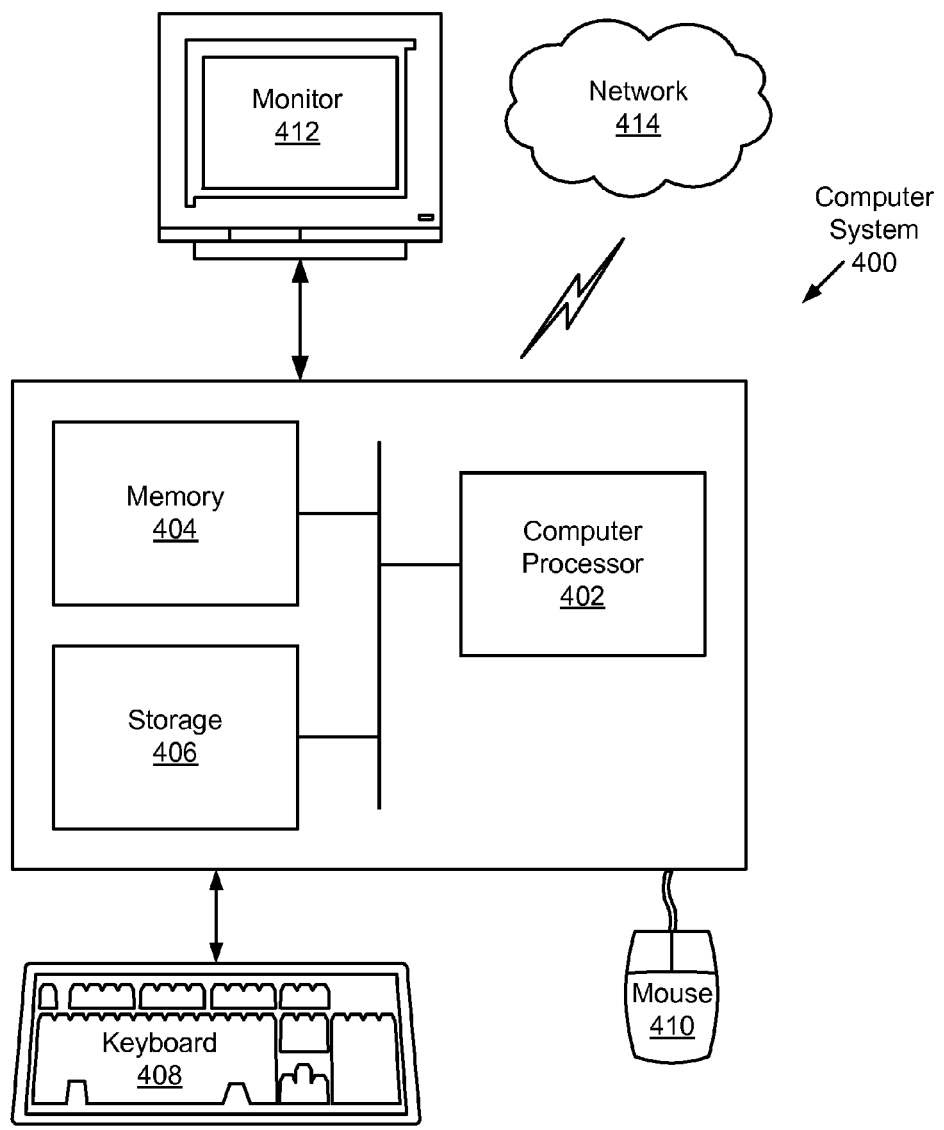
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more computer processor(s) (402) (such as a central processing unit (CPU), integrated circuit, hardware processor, etc.), associated Memory (404) (e.g., RAM, cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, in one or more embodiments of the invention, one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for a compiler, comprising:
    receiving, by the compiler and from an interpreter, a representation of a code section having a control path that changes the representation, wherein the representation is an abstract syntax tree (AST) comprising a plurality of nodes, each of the plurality of nodes storing associated profiling data, and wherein the profiling data comprises a threshold;
    compiling, by the compiler, a machine code of the representation by:
        performing, based on the threshold, a partial evaluation of the interpreter executing the representation,
        wherein the control path is replaced with a deoptimization point during compilation of the machine code;
    triggering the deoptimization point during execution of the machine code; and
    returning execution to the interpreter based on the triggering.

2. The method of claim 1, further comprising:
    generating, by the interpreter, the representation of the code section;
    collecting, during runtime, the profiling data; and
    updating the representation based on the profiling data.

3. The method of claim 2, wherein updating the representation comprises changing a type of an operation.

4. The method of claim 1, wherein the AST dynamically changes at runtime.

5. The method of claim 1, wherein the partial evaluation comprises:
    inlining an execute method for a node of the plurality of nodes of the AST.

6. The method of claim 1, wherein the representation comprises a subset of a method.

7. A non-transitory computer-readable medium (CRM) storing a plurality of instructions for a compiler, the plurality of instructions comprising functionality to:
    receive, from an interpreter, a representation of a code section having a control path that changes the representation, wherein the representation is an abstract syntax tree AST comprising a plurality of nodes, each of the plurality of nodes storing associated profiling data, and wherein the profiling data comprises a threshold; and
    compile a machine code of the representation by:
        performing, based on the threshold, a partial evaluation of the interpreter executing the representation,
        wherein the control path is replaced with a deoptimization point during compilation of the machine code, and
        wherein triggering the deoptimization point during execution of the machine code returns execution to the interpreter.

8. The non-transitory CRM of claim 7, wherein the plurality of instructions comprise further functionality to:
    generate, by the interpreter, the representation of a code section;
    collect, during runtime, the profiling data; and
    update the representation based on the profiling data.

9. The non-transitory CRM of claim 8, wherein updating the representation comprises changing a type of an operation.

10. The non-transitory CRM of claim 7, wherein the AST dynamically changes at runtime.

11. The non-transitory CRM of claim 7, wherein the plurality of instructions comprise further functionality to:
    inline an execute method for a node of the plurality of nodes of the AST.

12. The non-transitory CRM of claim 7, wherein the representation comprises a subset of a method.

13. A system for a compiler, comprising:
a processor and a memory;
an interpreter executing on the processor and configured to:
execute a representation of a code section having a control path that changes the representation, wherein the representation is an abstract syntax tree (AST) comprising a plurality of nodes, each of the plurality of nodes storing associated profiling data, and wherein the profiling data comprises a threshold; and
a compiler executing on the processor and configured to:
receive, from the interpreter, the representation of the code section;
compile a machine code of the representation by:
performing, based on the threshold, a partial evaluation of the interpreter executing the representation, wherein the control path is replaced with a deoptimization point during compilation of the machine code;
trigger the deoptimization point during execution of the machine code; and
return execution to the interpreter based on the triggering.

14. The system of claim 13, the interpreter comprising further functionality to:
generate the representation of a code section;
collect, during runtime, the profiling data; and
update the representation based on the profiling data.

15. The system of claim 14, wherein updating the representation comprises changing a type of an operation.

16. The system of claim 13, wherein the AST dynamically changes at runtime.

17. The system of claim 13, wherein the partial evaluation comprises:
inlining an execute method for a node of the plurality of nodes of the AST.

* * * * *

UNITED STATES PATENT AND TRADEMARK OFFICE
CERTIFICATE OF CORRECTION

| | | |
|---|---|---|
| PATENT NO. | : 8,930,920 B2 | Page 1 of 1 |
| APPLICATION NO. | : 13/731698 | |
| DATED | : January 6, 2015 | |
| INVENTOR(S) | : Wuerthinger et al. | |

It is certified that error appears in the above-identified patent and that said Letters Patent is hereby corrected as shown below:

In the specification,

In column 4, line 67, delete "children," and insert -- children. --, therefor.

In column 5, line 4, delete "node" and insert -- node. --, therefor.

In column 8, line 41, delete "my" and insert -- may --, therefor.

In column 9, line 12, delete "necessary," and insert -- necessary. --, therefor.

In the claims,

In column 10, line 42, in Claim 7, delete "AST" and insert -- (AST) --, therefor.

Signed and Sealed this
Twelfth Day of July, 2016

Michelle K. Lee
*Director of the United States Patent and Trademark Office*